United States Patent [19]

Heurich et al.

[11] Patent Number: 4,726,557

[45] Date of Patent: Feb. 23, 1988

[54] MOUNTING PLATE FOR BELT TENSIONING ROLLERS

[75] Inventors: Günther Heurich, Schweinfurt; Horst Laudenbach, Schwebheim; Richard Mützel, Thundorf, all of Fed. Rep. of Germany

[73] Assignee: FAG Kugelfischer Georg Schafer (KGaA), Fed. Rep. of Germany

[21] Appl. No.: 884,998

[22] Filed: Jul. 14, 1986

[30] Foreign Application Priority Data

Jul. 24, 1985 [DE] Fed. Rep. of Germany ..... 35264837

[51] Int. Cl.$^4$ ................................................ F16H 7/08
[52] U.S. Cl. .................................... 248/666; 248/674; 248/300; 474/136
[58] Field of Search ............... 248/666, 667, 674, 662, 248/660, 664, 558, 637, 639, 659, 300; 474/133, 136

[56] References Cited

U.S. PATENT DOCUMENTS

| | | | |
|---|---|---|---|
| 1,737,467 | 11/1929 | Mahaffey | 474/136 |
| 2,302,812 | 11/1942 | Stempel | 248/660 |
| 2,873,082 | 2/1959 | Gillespie | 248/300 |
| 2,976,745 | 3/1961 | Bade | 248/666 |
| 3,358,521 | 12/1967 | Browning | 474/133 |

FOREIGN PATENT DOCUMENTS

| | | | |
|---|---|---|---|
| 8501850 | 4/1985 | Fed. Rep. of Germany . | |
| 546766 | 11/1922 | France | 248/660 |
| 56-53561 | 5/1981 | Japan | 248/674 |
| 571087 | 8/1945 | United Kingdom . | |
| 927186 | 5/1963 | United Kingdom | 248/664 |

*Primary Examiner*—Reinaldo P. Machado
*Assistant Examiner*—Alvin Chin-Shue
*Attorney, Agent, or Firm*—Ostrolenk, Faber, Gerb & Soffen

[57] ABSTRACT

A mounting plate for belt tensioning or guide rollers, or the like, which includes an attachment place generally more centrally disposed along the mounting plate at which the roller is supported and at least two tensioning places at opposite sides of the attachment place for the roller. The plate being attached to a mounting housing at the tensioning places. The plate having resting surfaces protruding from it toward the housing to which the plate is mounted and the resting surface in the attachment place in the region of the tensioning roller protrudes to a greater height than the resting surfaces at the tensioning places for assuring support of the roller against the housing. In another version, the mounting plate is slightly V shaped or concave, with the two tensioning places being on one arm of the V and the attachment place in the region of the tensioning roller on the other arm of the V.

1 Claim, 6 Drawing Figures

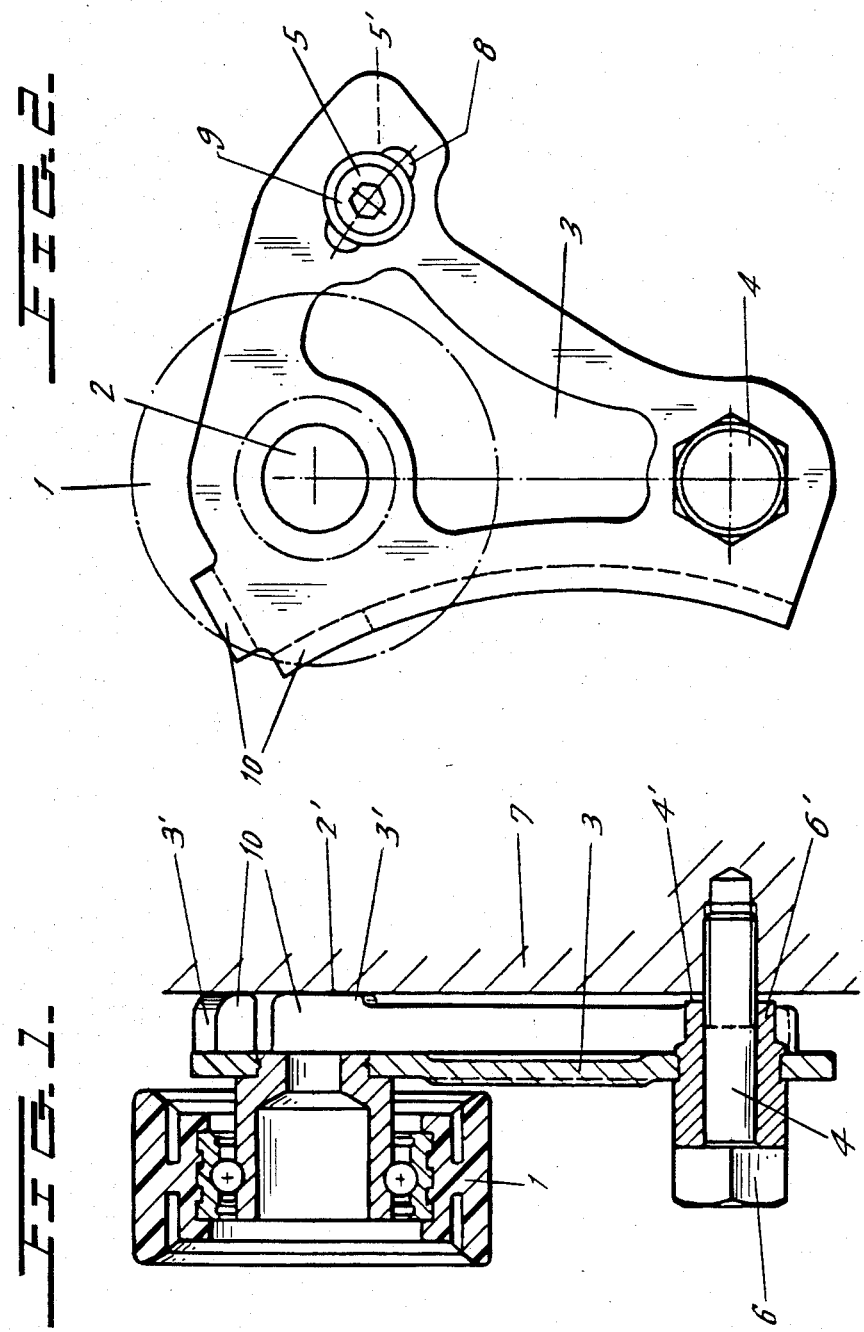

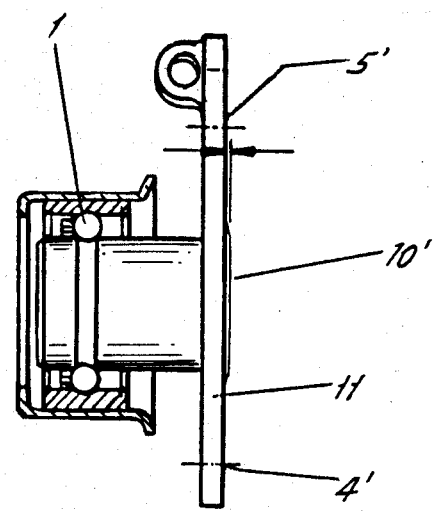
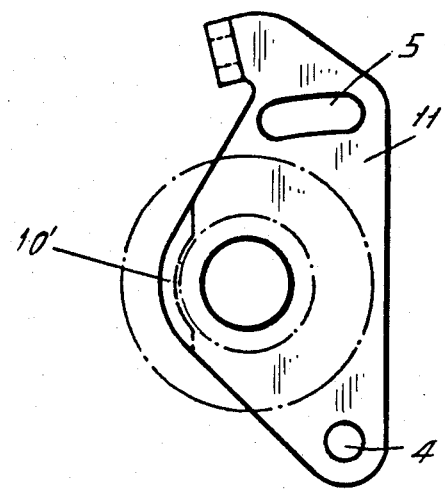
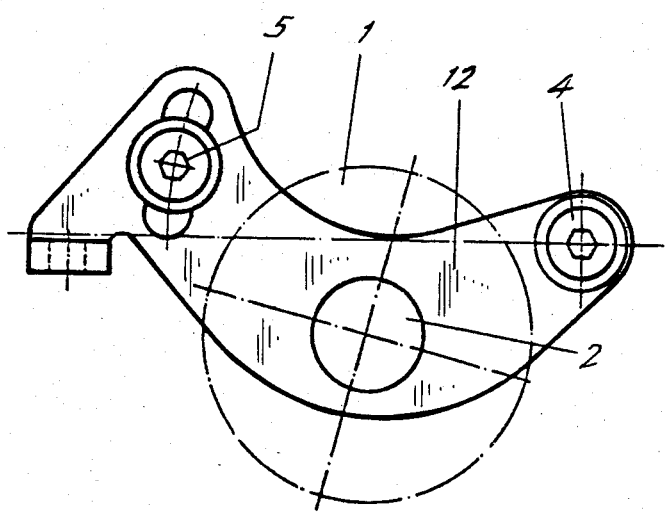
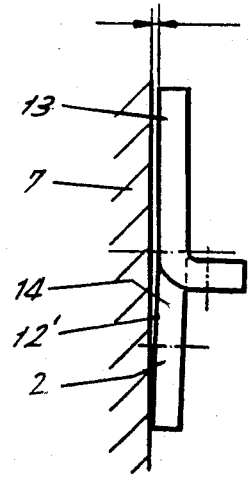

MOUNTING PLATE FOR BELT TENSIONING ROLLERS

BACKGROUND OF THE INVENTION

The present invention relates to a mounting plate for belt-tensioning rollers.

Mounting plates for belt-tensioning rollers are used in many applications. As long as the mounting plate is sufficiently thick, scarcely any problems arise due to mounting plate damage. However, in lightweight constructions and to save expenses, relatively thin-walled mounting plates have been used for some time. This has resulted in frequent breakage of the mounting plate during mounting. This has occurred even though the stresses applied by the tensioning of the belt are not so great that such defects should occur.

SUMMARY OF THE INVENTION

The object of the present invention is to develop the mounting plate so that it will not suffer damage in normal use.

Another object of the invention is to enable the mounting plate to be thin-walled and light weight yet be able to withstand the tension of attachment of the mounting plate to a housing.

According to the invention, a mounting plate for a belt-tensioning guide roll has an attachment place in the region of the tensioning roller itself and has two tensioning places spaced away from the attachment place. The tensioning places are generally at opposite sides of the attachment place, whereby attachment of the mounting plate to a housing at the tensioning places by appropriate attachment means presses the mounting plate toward the housing in the region of the tensioning roller. On the mounting plate, the tensioning places are staggered with respect to the attachment place, that is, a line between the tensioning places does not intersect the attachment place.

In the regions of the attachment place and in both of the tensioning places, the mounting plate is provided with resting surfaces which are disposed against the housing when the plate is mounted, and by these surfaces, the mounting plate and therefore the tensioning and guide rollers are supported on the housing. The resting surfaces at both the attachment place and the tensioning places protrude toward the housing. In the unmounted condition of the mounting plate, that is, before it is mounted to the housing, the resting surface on the mounting plate in the region of the tensioning roller protrudes toward the housing slightly further than the resting surfaces at the two tensioning places. This assures that when the mounting plate is attached to the housing at the tensioning places, the mounting plate rests securely against the housing at the attachment place, which is the primary purpose of the attachment of the mounting plate to the housing.

The mounting plate includes one or more protrusions or elevations in the region of the tensioning roller which define those resting surfaces there.

Various configurations for the mounting plate are contemplated. In one embodiment, the mounting plate, when viewed from edge, has its surface which is opposite the housing developed in V shape or concavely. The two tensioning places are located on one arm of that V while the attachment place for the tensioning roller is located on the other arm of the V, perhaps in the vicinity of the vertex of the two arms.

In all embodiments, due to the above-described staggered arrangement of the places, the two tensioning places and the attachment place for the roller themselves together define a V. The V shape or concave shape of the mounting plate described above is a shape viewed in a different direction.

The resting surface or surfaces on the mounting plate that is in the region of the tensioning roller protrudes in the non-mounted state of the plate in the direction toward the housing, as compared with the heights of resting surfaces in the region of the tensioning places, this assures that, even when the resting surfaces are not manufactured with precision or upon elastic and/or plastic deformation of the plate, upon attachment of the mounting plate to the housing via attachment means, there is always a resting place for the surface on the housing in the region of the tensioning roller. This support provided by the protruding resting place avoids impermissible dynamic stresses in the mounting plate. Primarily static stresses occur, which do not break the mounting plate. Lifting off and vibration of the mounting plate in the region of the tensioning roller as a result of imprecise resting surfaces or elastic and/or plastic deformation of the mounting plate or the housing is prevented.

It is evident that the protrusion of the resting surface in the region of the tensioning roller, as compared with the resting surfaces of the two tensioning places, must be so dimensioned that the consequences of the above-mentioned sources of error are excluded. A protruding height of about 0.2 mm greater than the height of the resting surfaces at the tensioning places has proven necessary for this resting surface.

The protrusion of the resting surface in the region of the tensioning roller is produced most simply by an elevation provided at that place. Its size should be within the above-mentioned range. Upon tightening of the attachment means at the tensioning places, the resting of the mounting plate against the housing is then also assured in the region of the tensioning roller.

In another embodiment, at least the surface of the mounting plate which is opposite the housing can be developed to be concave, that is of V shape.

BRIEF DESCRIPTION OF THE DRAWINGS

Other objects and features of the invention are explained with reference to the drawings, in which FIG. 1 shows a cross-section and FIG. 2 an elevation of an embodiment in accordance with the invention;

FIG. 3 shows a cross-section and FIG. 4 an elevation of another embodiment in accordance to the invention:

FIG. 5 shows a side view and FIG. 6 an elevation of a third embodiment according to the invention.

DESCRIPTION OF THE PREFERRED EMBODIMENTS

In the embodiment shown in FIGS. 1 and 2, there is a tensioning roller 1 connected at the attachment location 2 to the mounting plate 3. Plate 3 includes widely separated tensioning places 4 and 5, which are both staggered from the attachment place 2 of the tensioning roller 1, whereby a line between tensioning places 4 and 5 does not intersect location 2. At the tensioning place 4, the mounting plate 3 is initially connected swingably by a bolt 6 to the housing 7. Then, after the below-described tensioning process, the plate 3 is no longer swingable. In this connection, the mounting plate 3 rests against the housing 7 only via the bent over sections 3' of the plate 3. The swinging of the plate 3 is made possible by the elongate slot 8 in the region of the tensioning place 5 and the plate is fixed by the screw 9.

Both attachment screws 6 and 9 must be firmly tightened for various reasons. As a result, large stresses are present in the region of the two tensioning places 4 and 5. In order to counteract the deformations of the plate 3 caused by these stresses, as well as to compensate for the errors in shape of the resting sides that occur during the manufacture, the resting surface 2', which is in the region of the tensioning roller 1, protrudes, in the unscrewed condition of the plate 3 in the direction toward the housing 7, as compared with the surfaces 4' and 5' of the tensioning places 4 and 5. The protruding portions of the resting surface 2' are indicated here by two elevated sections 10. Elevations 10 are near to, but not at, the roller 1, and are much further from tensioning places 4 and 5.

When screws 6 and 9 are now tightened, the elevations 10 assure that in the case of elastic and/or plastic deformations of the mounting plate 3 and/or of the housing 7 or in the case of non-planar resting surfaces of the mounting plate 3 and/or the housing 7, nonetheless the mounting plate 3 always rests against the housing 7 in the region of the tensioning roller 1.

FIGS. 3 and 4 show a variant of the embodiment of FIGS. 1 and 2. In this case, the mounting plate 11 comprises a flat part, which is provided in the region of the tensioning roller 1 with a slight elevation 10', which protrudes in the region of the tensioning roller 1 with respect to the tensioning places 4 and 5 having the surfaces 4' and 5'.

In FIGS. 5 and 6, the mounting plate 12 has a different shape than in the other Figures. However, the plate 12 has two tensioning places 4 and 5 and an attachment place 2 for the tensioning roller 1. In order to produce the required elevation, the mounting plate 12, including the surface 12' opposite the housing 7, is in this case bent into a slight V shape, shown in the view of FIG. 6 with the tensioning places 4 and 5 being on the one arm 13 and the attachment place 2 on the other arm 14 of the V.

Although the present invention has been described in connection with preferred embodiments thereof, many other variations and modifications will now become apparent to those skilled in the art without departing from the scope of the invention. It is preferred, therefore, that the present invention be limited not by the specific disclosures herein, but only by the appended claims.

What is claimed is:

1. A mounting plate for a belt tensioning roller, a guide roller, or the like, the plate including thereon an attachment place for the roller to be attached, first and second tensioning places at which the plate is to be tensioned, the tensioning plates being located away from the attachment place generally at opposite sides thereof, the mounting plate having one side surface which is to be disposed toward a generally flat housing surface, or the like, to which the mounting plate is to be attached;

opposite the one side surface, the mounting plate having another side surface adapted to have a roller disposed in confronting relationship with respect thereto;

on the one side surface, the mounting plate having respective resting surfaces at the attachment place and at the tensioning places, and the resting surfaces being adapted for resting against the housing surface when the mounting plate is attached to the housing surface at or near the first and second tensioning places;

the resting surface in the region of the roller and the attachment place protruding to a greater height than the resting surfaces at the tensioning places, such that when the resting surfaces are disposed against the housing surface and the mounting plate is attached to the housing at the tensioning places, the resting surface in the region of the roller will be strongly urged against the housing surface;

the mounting plate being shaped so that the one side surface thereof from which the resting surfaces protrude is generally V shaped, the V shaped one side surface having one arm of the V on which the tensioning places are defined and another arm of the V on which the attachment place in the region of the roller is defined; and wherein the entire mounting plate is a flat plate bent into a generally V shape.

* * * * *